United States Patent
Mills et al.

(10) Patent No.: US 10,774,792 B2
(45) Date of Patent: Sep. 15, 2020

(54) EVAPORATIVE EMISSIONS ISOLATION MODULE CAM SYSTEM

(71) Applicant: Eaton Intelligent Power Limited, Dublin (IE)

(72) Inventors: Vaughn K. Mills, Chelsea, MI (US); Matthew Memmer, Plymouth, MI (US)

(*) Notice: Subject to any disclaimer, the term of this patent is extended or adjusted under 35 U.S.C. 154(b) by 0 days.

(21) Appl. No.: 16/367,414

(22) Filed: Mar. 28, 2019

(65) Prior Publication Data
US 2019/0219002 A1 Jul. 18, 2019

Related U.S. Application Data

(63) Continuation of application No. PCT/US2017/054039, filed on Sep. 28, 2017.
(Continued)

(51) Int. Cl.
*F02M 25/08* (2006.01)
*B60K 15/035* (2006.01)
(Continued)

(52) U.S. Cl.
CPC ..... *F02M 25/0836* (2013.01); *B01D 53/0446* (2013.01); *B60K 15/03* (2013.01);
(Continued)

(58) Field of Classification Search
CPC .. F03M 25/089; F03M 25/0854; B60K 15/03; B60K 15/035; B60K 15/03504;
(Continued)

(56) References Cited

U.S. PATENT DOCUMENTS

| 10,400,713 B2* | 9/2019 | Mills | F02D 41/004 |
| 2002/0078932 A1* | 6/2002 | Weldon | F02M 25/0836 |
| | | | 123/520 |

(Continued)

FOREIGN PATENT DOCUMENTS

| WO | 2016049320 A1 | 3/2016 |
| WO | 2017046242 A1 | 3/2017 |

OTHER PUBLICATIONS

International Search Report and Written Opinion for International Application No. PCT/US2017/054039 dated Jan. 2, 2018, 13 pages.

*Primary Examiner* — Phutthiwat Wongwian
*Assistant Examiner* — Arnold Castro
(74) *Attorney, Agent, or Firm* — RMCK Law Group PLC

(57) ABSTRACT

An evaporative emissions isolation module system configured to manage venting on a fuel tank system is disclosed. The isolation module system includes a carbon canister, a multi-valve assembly and a controller. The carbon canister is adapted to collect fuel vapor emitted by the fuel tank and to subsequently release the fuel vapor to the engine. The multi-valve assembly includes a motor drive that rotates a camshaft having at least a first cam and a second cam housed in a manifold. The multi-valve assembly has a first valve and a second valve. The first valve selectively fluidly connects the fuel tank and the carbon canister. The second valve fluidly connects the carbon canister with a vent port defined in the manifold that vents to atmosphere. The controller sends signals to the multi-valve assembly based on operating conditions to open and close at least one of the first and second valves.

15 Claims, 17 Drawing Sheets

Related U.S. Application Data

(60) Provisional application No. 62/400,937, filed on Sep. 28, 2016.

(51) Int. Cl.
  B60K 15/03 (2006.01)
  F01L 9/02 (2006.01)
  B01D 53/04 (2006.01)
  F02D 41/00 (2006.01)

(52) U.S. Cl.
  CPC ...... B60K 15/035 (2013.01); B60K 15/03504 (2013.01); F02D 41/003 (2013.01); F02M 25/089 (2013.01); F02M 25/0854 (2013.01); *B01D 2253/102* (2013.01); *B01D 2257/7022* (2013.01); *B01D 2259/40003* (2013.01); *B01D 2259/4516* (2013.01); *B60K 2015/03533* (2013.01); *B60K 2015/03576* (2013.01); *B60K 2015/03585* (2013.01)

(58) Field of Classification Search
  CPC ........... B60K 2015/03576; B60K 2015/03533; B60K 2015/03585; B01D 53/0446; B01D 2253/102; B01D 2257/7022; B01D 2259/4516; B01D 2259/40003; F02D 41/003; Y10T 137/86863
  See application file for complete search history.

(56) References Cited

U.S. PATENT DOCUMENTS

| | | |
|---|---|---|
| 2003/0196645 A1 | 10/2003 | Kojima et al. |
| 2008/0023662 A1 | 1/2008 | Reinicke et al. |
| 2012/0152210 A1 | 6/2012 | Reddy et al. |
| 2015/0083088 A1* | 3/2015 | Pearce ............... F02M 25/0809 123/520 |
| 2017/0328311 A1* | 11/2017 | Franklin .......... B60K 15/03519 |
| 2018/0029468 A1* | 2/2018 | Mills .................. F16K 31/0651 |
| 2018/0087475 A1* | 3/2018 | Mills ................ B60K 15/03519 |
| 2019/0040821 A1* | 2/2019 | Ishihara ............ F02M 25/0836 |
| 2019/0105984 A1* | 4/2019 | Mills .................. F02M 25/0836 |
| 2019/0145326 A1* | 5/2019 | Nahar .............. B60K 15/03504 123/519 |
| 2019/0353121 A1* | 11/2019 | Mills .................... F02M 25/089 |

* cited by examiner

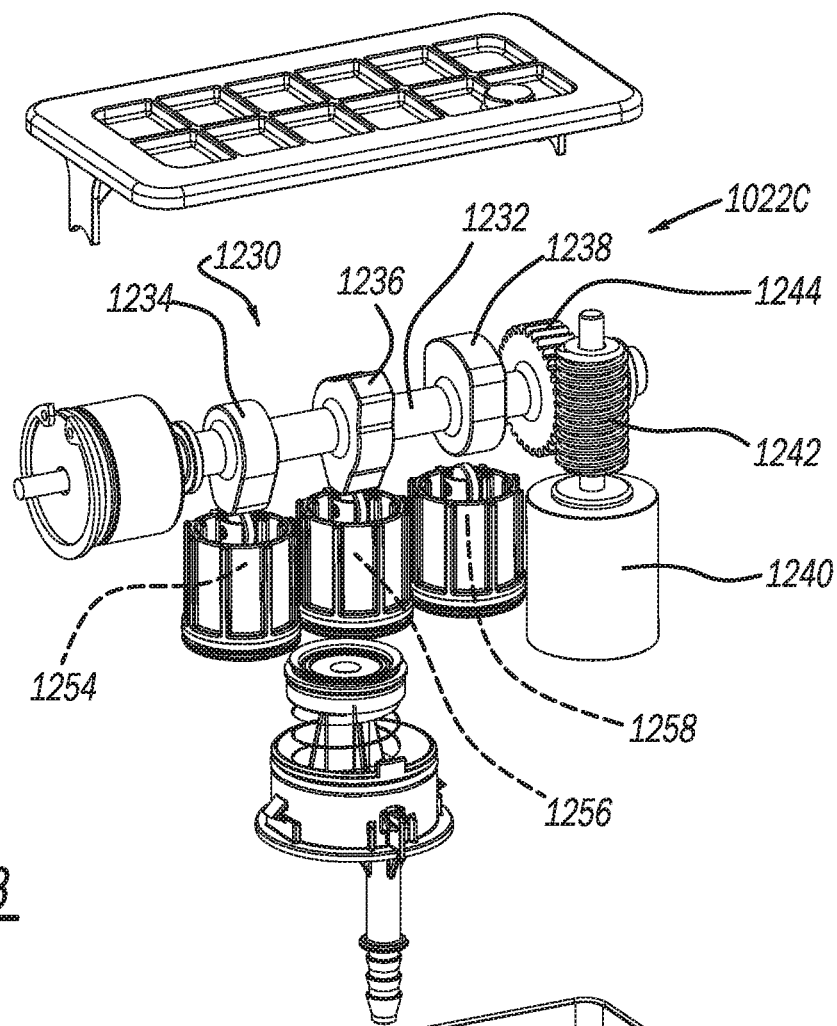
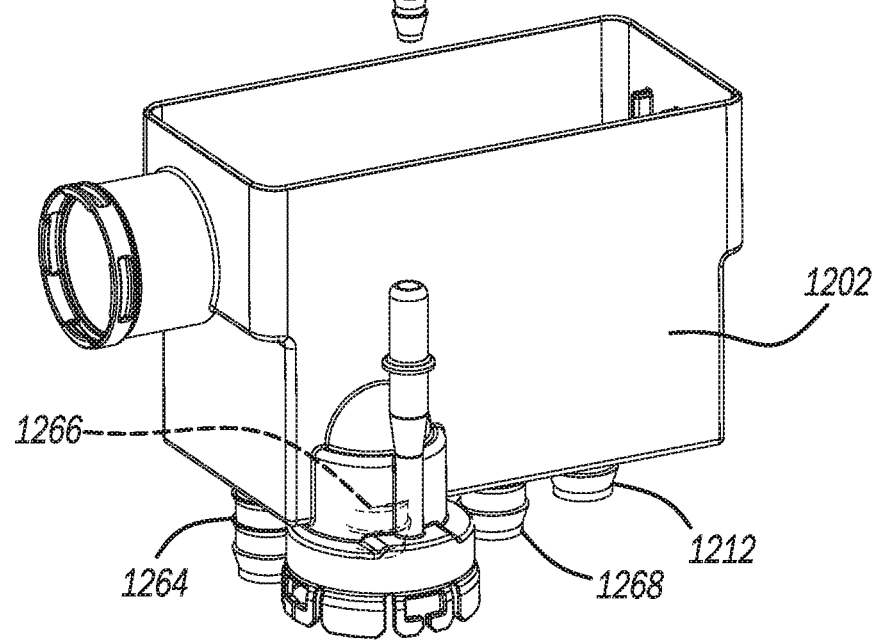
FIG - 13

# EVAPORATIVE EMISSIONS ISOLATION MODULE CAM SYSTEM

CROSS REFERENCE TO RELATED APPLICATIONS

This application is a continuation of International Application No. PCT/US2017/054039 filed Sep. 28, 2017, which claims the benefit of U.S. Patent Application No. 62/400,937 filed on Sep. 28, 2016. The disclosure of the above application is incorporated herein by reference.

FIELD

The present disclosure relates generally to fuel tanks on passenger vehicles and more particularly to a fuel tank having an electronically controlled module that manages the complete evaporative system for the vehicle.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An evaporative emissions isolation module system configured to manage venting on a fuel tank system configured to deliver fuel to an internal combustion engine is disclosed. The isolation module system includes a carbon canister, a multi-valve assembly and a controller. The carbon canister is adapted to collect fuel vapor emitted by the fuel tank and to subsequently release the fuel vapor to the engine. The multi-valve assembly includes a motor drive that rotates a camshaft having at least a first cam and a second cam housed in a manifold. The multi-valve assembly has a first valve and a second valve. The first valve selectively fluidly connects the fuel tank and the carbon canister. The second valve fluidly connects the carbon canister with a vent port defined in the manifold that vents to atmosphere. The controller sends signals to the multi-valve assembly based on operating conditions to open and close at least one of the first and second valves.

According to additional features the multi-valve assembly comprises a third cam provided on the camshaft. A third valve selectively fluidly connects the carbon canister and the engine. A first vent line is fluidly connected between the fuel tank and the first valve. A second vent line is fluidly connected between the carbon canister and the first valve. A third vent line is fluidly connected between the second valve and the carbon canister. The first valve includes a valve body and further comprises a poppet, a seal and a biasing member. The biasing member urges the seal of the poppet to a closed position sealingly engaged to the first valve body.

In other features, a first isolation diaphragm is positioned between the first valve and the manifold. The first isolation diaphragm seals the first and second fluid lines from the manifold. The third valve includes a valve body and further comprises a poppet, a seal and a biasing member. The biasing member urges the seal of the poppet to a closed position sealingly engaged to the third valve body. A second isolation diaphragm is positioned between the third valve and the manifold. The second isolation diaphragm seals the fourth and fifth fluid lines from the manifold. A first push pin is positioned between the first cam and the first valve. A second push pin is positioned between the third cam and the third valve. A vapor management valve is disposed on the fifth fluid line between the multi-valve assembly and the engine.

An evaporative emissions isolation module system configured to manage venting on a fuel tank system configured to deliver fuel to an internal combustion engine is disclosed. The isolation module system includes a carbon canister, a multi-valve assembly and a controller. The carbon canister is adapted to collect fuel vapor emitted by the fuel tank and to subsequently release the fuel vapor to the engine. The multi-valve assembly includes a motor drive that rotates a camshaft having at least a first cam and a second cam housed in a manifold. The multi-valve assembly has a first valve and a second valve. The first valve selectively fluidly connects the manifold and the carbon canister. The second valve fluidly connects the carbon canister and the engine. The controller sends signals to the multi-valve assembly based on operating conditions to open and close at least one of the first and second valves.

According to additional features, the evaporative emissions isolation module system further comprises an evaporative emissions control system that recaptures and recycles emitted fuel vapor on a vehicle fuel tank. The evaporative emissions control system comprises a first vent tube, a second vent tube and a vent shut-off assembly. The first vent tube is disposed in the fuel tank. The second vent tube is disposed on the fuel tank. The first vent valve is disposed on the first vent tube and is configured to selectively open and close a first port fluidly coupled to the first vent tube. The second vent valve is disposed on the second vent tube and is configured to selectively open and close a second port fluidly coupled to the second vent tube. A vent shut-off assembly selectively opens and closes the first and second valves to provide overpressure and vacuum relief for the fuel tank.

According to additional features, the vent shut-off assembly comprises a cam assembly having a cam shaft that includes a first cam and a second cam. The first and second cams have respective profiles that correspond to at least a fully opened valve position, a fully closed valve position and a partially open valve position. The first and second vent valves are caused to selectively open and close based on rotation of the respective first and second cams to deliver fuel vapor through the respective first and second vent tubes.

BRIEF DESCRIPTION OF THE DRAWINGS

The present disclosure will become more fully understood from the detailed description and the accompanying drawings, wherein:

FIG. 13 is an exploded view of the vent shut-off assembly of FIG. 10;

DETAILED DESCRIPTION

Figure 1:
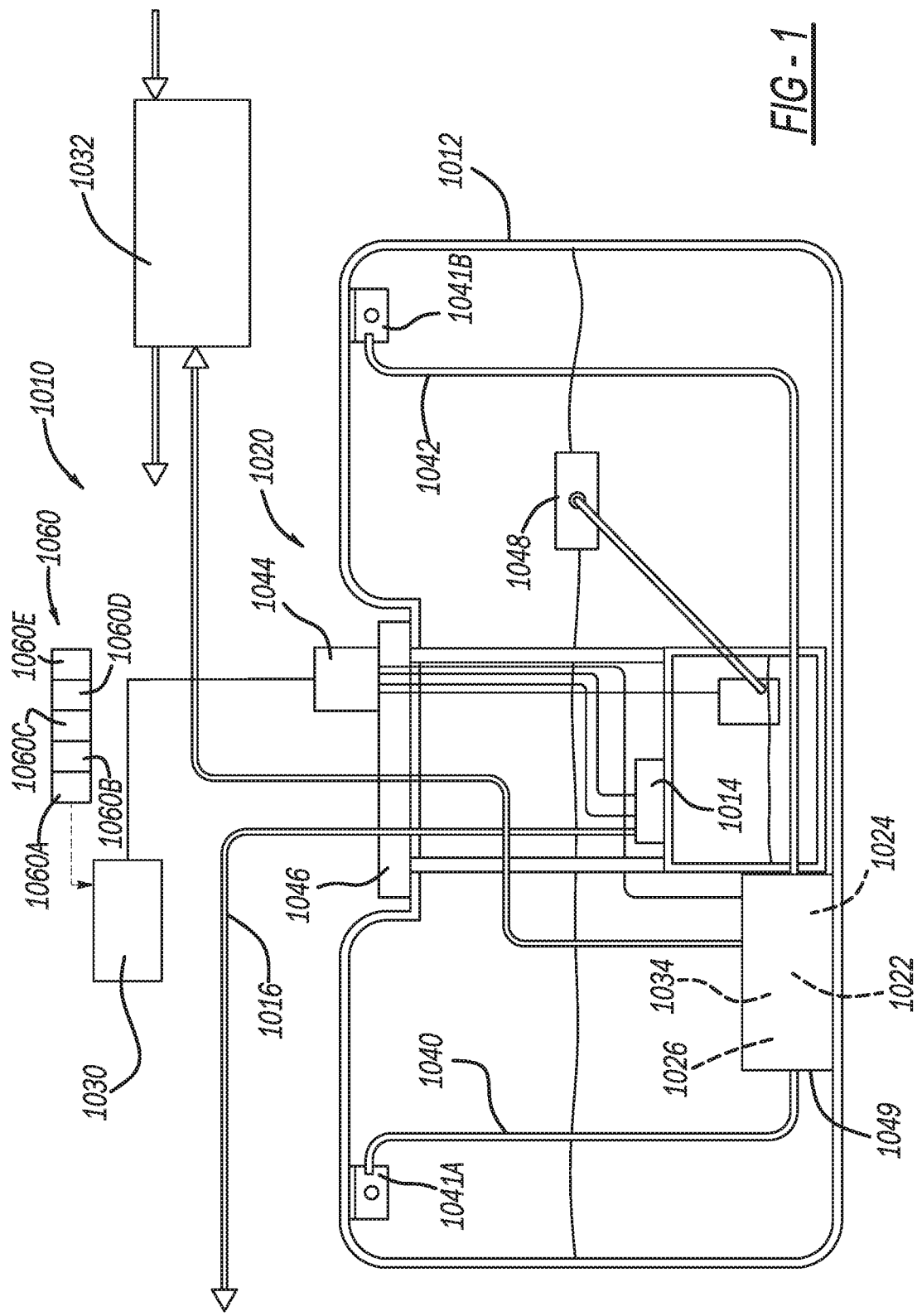
FIG. 1 is a schematic illustration of a fuel tank system having an evaporative emissions control system including a vent shut-off assembly, a controller, an electrical connector and associated wiring in accordance to one example of the present disclosure.

With initial reference to FIG. 1, a fuel tank system constructed in accordance to one example of the present disclosure is shown and generally identified at reference number 1010. The fuel tank system 1010 can generally include a fuel tank 1012 configured as a reservoir for holding fuel to be supplied to an internal combustion engine via a fuel delivery system, which includes a fuel pump 1014. The fuel pump 1014 can be configured to deliver fuel through a fuel supply line 1016 to a vehicle engine. An evaporative emissions control system 1020 can be configured to recapture and recycle the emitted fuel vapor. As will become appreciated from the following discussion, the evaporative emissions control system 1020 provides an electronically controlled module that manages the complete evaporative system for a vehicle.

The evaporative emissions control system 1020 provides a universal design for all regions and all fuels. In this regard, the requirement of unique components needed to satisfy regional regulations may be avoided. Instead, software may be adjusted to satisfy wide-ranging applications. In this regard, no unique components need to be revalidated saving time and cost. A common architecture may be used across vehicle lines. Conventional mechanical in-tank valves may be replaced. As discussed herein, the evaporative control system 1020 may also be compatible with pressurized systems including those associated with hybrid powertrain vehicles.

The evaporative emissions control system 1020 includes a vent shut-off assembly 1022, a manifold assembly 1024, a liquid trap 1026, a control module 1030, a purge canister 1032, an energy storage device 1034, a first vapor tube 1040, a second vapor tube 1042, an electrical connector 1044, a fuel delivery module (FDM) flange 1046 and a float level sensor assembly 1048. The first vapor tube 1040 can terminate at a vent opening 1041A that may include a baffle arranged at a top corner of the fuel tank 1012. Similarly, the second vapor tube 1042 can terminate at a vent opening 1041B that may include a baffle arranged at a top corner of the fuel tank 1012.

In one example, the manifold assembly 1024 can include a manifold body 1049 (FIG. 3) that routes venting to an appropriate vent tube 1040 and 1042 (or other vent tubes) based on operating conditions. As will become appreciated from the following discussion, the vent shut-off assembly 1022 can take many forms such as electrical systems including solenoids and mechanical systems including DC motor actuated cam systems.

Figure 2:
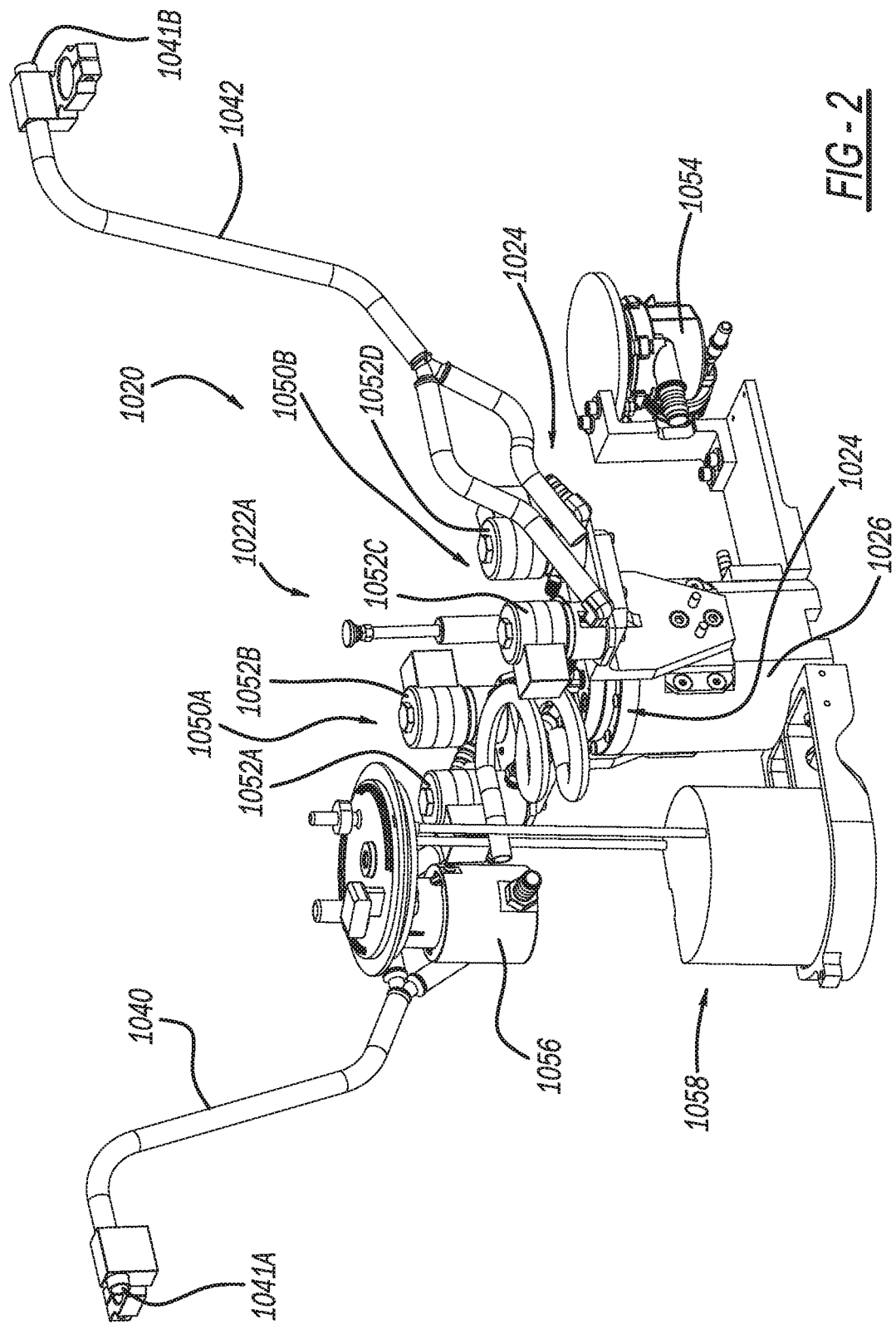
FIG. 2 is a front perspective view of an evaporative emissions control system including a vent shut-off assembly configured with solenoids according to one example of the present disclosure.
Figure 3:
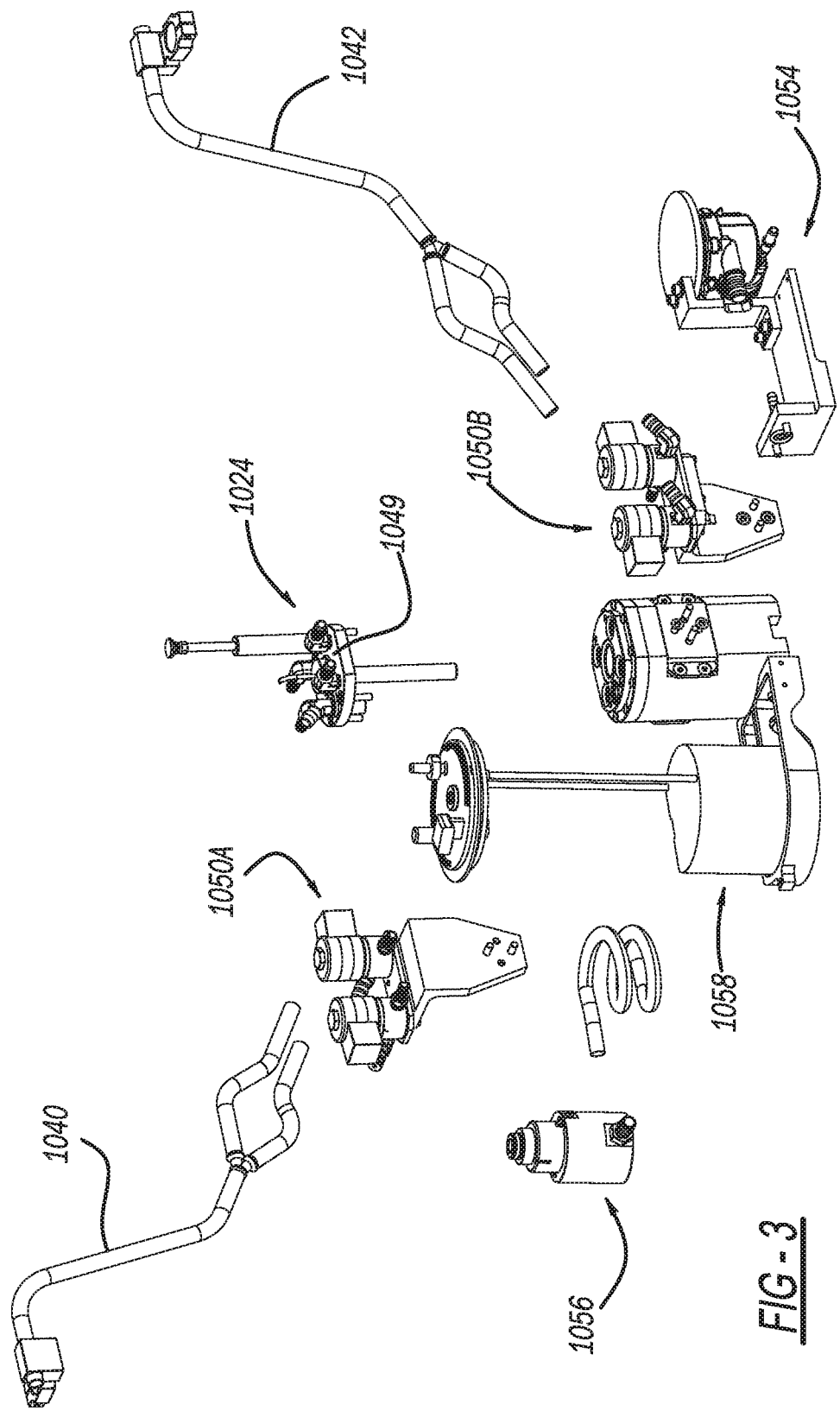
FIG. 3 is an exploded view of the evaporative emissions control system of FIG. 2.

Turning now to FIGS. 2 and 3, a vent shut-off assembly 1022A constructed in accordance to one example of the present disclosure is shown. As can be appreciated, the vent shut-off assembly 1022A can be used as part of an evaporative emissions control system 1020 in the fuel tank system 1010 described above with respect to FIG. 1. The vent shut-off assembly 1022A includes two pair of solenoid banks 1050A and 1050B. The first solenoid bank 1050A includes first and second solenoids 1052A and 1052B. The second solenoid bank 1050B includes third and fourth solenoids 1052C and 1052D.

The first and second solenoids 1052A and 1052B can be fluidly connected to the vapor tube 1040. The third and fourth solenoids 1052C and 1052D can be fluidly connected to the vapor tube 1042. The control module 1030 can be adapted to regulate the operation of the first, second, third and fourth solenoids 1052A, 1052B, 1052C and 1052D to selectively open and close pathways in the manifold assembly 1024, in order to provide over-pressure and vacuum relief for the fuel tank 1012. The evaporative emissions control assembly 1020 can additionally comprise a pump 1054, such as a venturi pump and a safety rollover valve 1056. A conventional sending unit 1058 is also shown.

The control module 1030 can further include or receive inputs from system sensors, collectively referred to at reference 1060. The system sensors 1060 can include a tank pressure sensor 1060A that senses a pressure of the fuel tank 1012, a canister pressure sensor 1060B that senses a pressure of the canister 1032, a temperature sensor 1060C that senses a temperature within the fuel tank 1012, a tank pressure sensor 1060D that senses a pressure in the fuel tank 1012 and a vehicle grade sensor and or vehicle accelerometer 1060E that measures a grade and/or acceleration of the vehicle. It will be appreciated that while the system sensors 1060 are shown as a group, that they may be located all around the fuel tank system 1010.

The control module 1030 can additionally include fill level signal reading processing, fuel pressure driver module functionality and be compatible for two-way communications with a vehicle electronic control module (not specifically shown). The vent shut-off assembly 1022 and manifold assembly 1024 can be configured to control a flow of fuel vapor between the fuel tank 1012 and the purge canister 1032. The purge canister 1032 adapted to collect fuel vapor emitted by the fuel tank 1012 and to subsequently release the fuel vapor to the engine. The control module 1030 can also be configured to regulate the operation of evaporative emissions control system 1020 in order to recapture and recycle the emitted fuel vapor. The float level sensor assembly 1048 can provide fill level indications to the control module 1030.

When the evaporative emissions control system 1020 is configured with the vent shut-off assembly 1022A, the control module 1030 can close individual solenoids 1052A-1052D or any combination of solenoids 1052A-1052D to vent the fuel tank system 1010. For example, the solenoid 1052A can be actuated to close the vent 1040 when the float level sensor assembly 1048 provides a signal indicative of a full fuel level state. While the control module 1030 is shown in the figures generally remotely located relative to the solenoid banks 1050A and 1050B, the control module 1030 may be located elsewhere in the evaporative emissions control system 1020 such as adjacent the canister 1032 for example.

With continued reference to FIGS. 1-3, additional features of the evaporative emissions control system 1020 will be described. In one configuration, the vent tubes 1040 and 1042 can be secured to the fuel tank 1012 with clips. The inner diameter of the vent tubes 1040 and 1042 can be 3-4 mm. In some examples, the poppet valve assembly or cam lobes will determine smaller orifice sizes. The vent tubes 1040 and 1042 can be routed to high points of the fuel tank 1012. In other examples, external lines and tubes may additionally or alternatively be utilized. In such examples, the external lines are connected through the tank wall using suitable connectors such as, but not limited to, welded nipple and push-through connectors.

As identified above, the evaporative emissions control system 1020 can replace conventional fuel tank systems that require mechanical components including in-tank valves with an electronically controlled module that manages the complete evaporative system for a vehicle. In this regard, some components that may be eliminated using the evaporative emissions control system 1020 of the instant disclosure can include in-tank valves such as GVV's and FLVV's, canister vent valve solenoid and associated wiring, tank pressure sensors and associated wiring, fuel pump driver module and associated wiring, fuel pump module electrical connector and associated wiring, and vapor management valve(s) (system dependent). These eliminated components are replaced by the control module 1030, vent shut-off assembly 1022, manifold 1024, solenoid banks 1050A, 1050B and associated electrical connector 1044. Various other components may be modified to accommodate the evaporative emissions control system 1020 including the fuel tank 1012. For example, the fuel tank 1012 may be modified to eliminate valves and internal lines to pick-up points. The flange of the FDM 1046 may be modified to accommodate other components such as the control module 1030 and/or the electrical connector 1044. In other configurations, the fresh air line of the canister 1032 and a dust box may be modified. In one example, the fresh air line of the canister 1032 and the dust box may be connected to the control module 1030.

Figure 4:
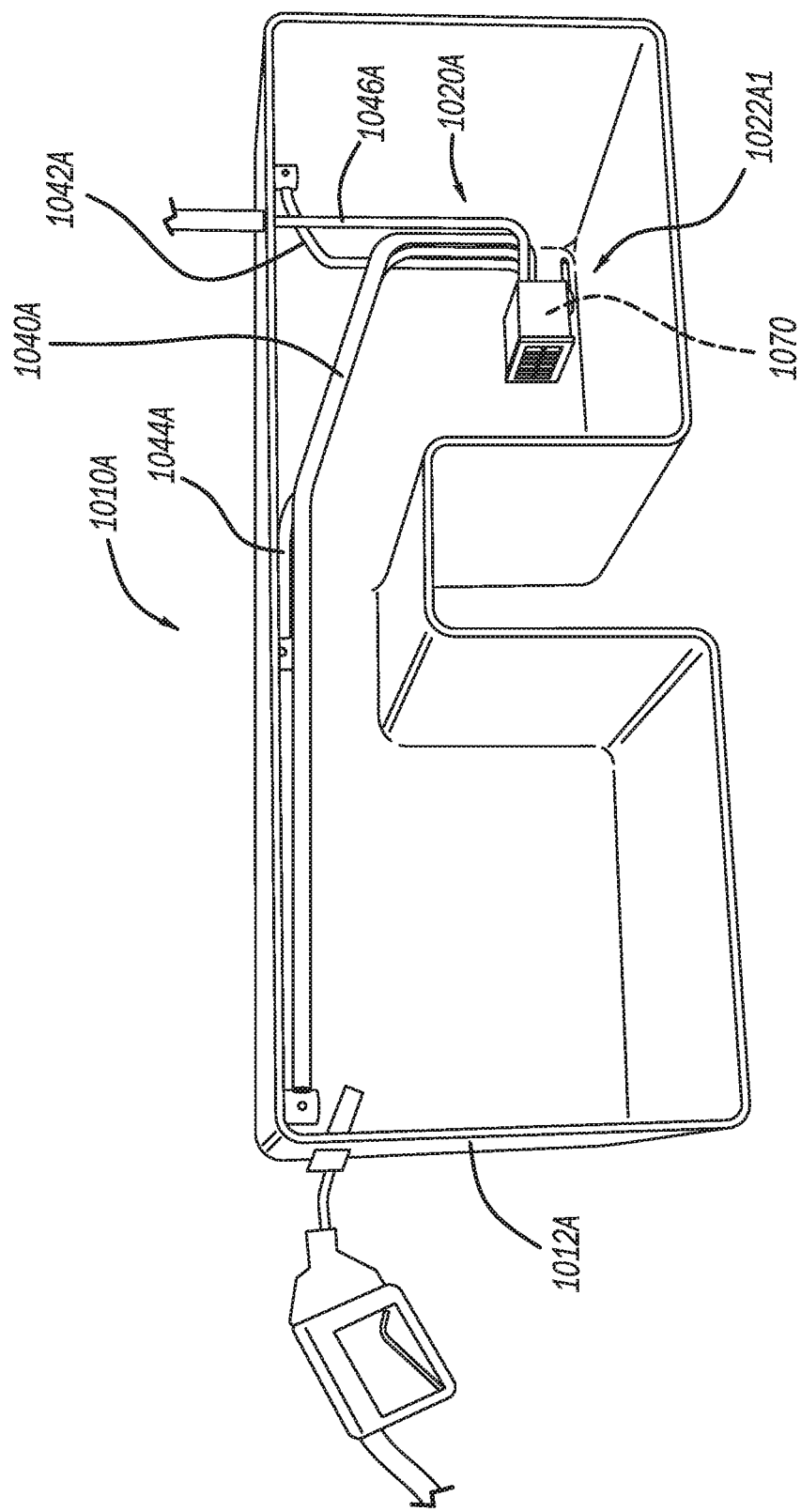
FIG. 4 is a perspective view of a fuel tank system having a vent shut-off assembly and configured for use on a saddle fuel tank according to another example of the present disclosure and shown with the fuel tank in section view.
Figure 5:
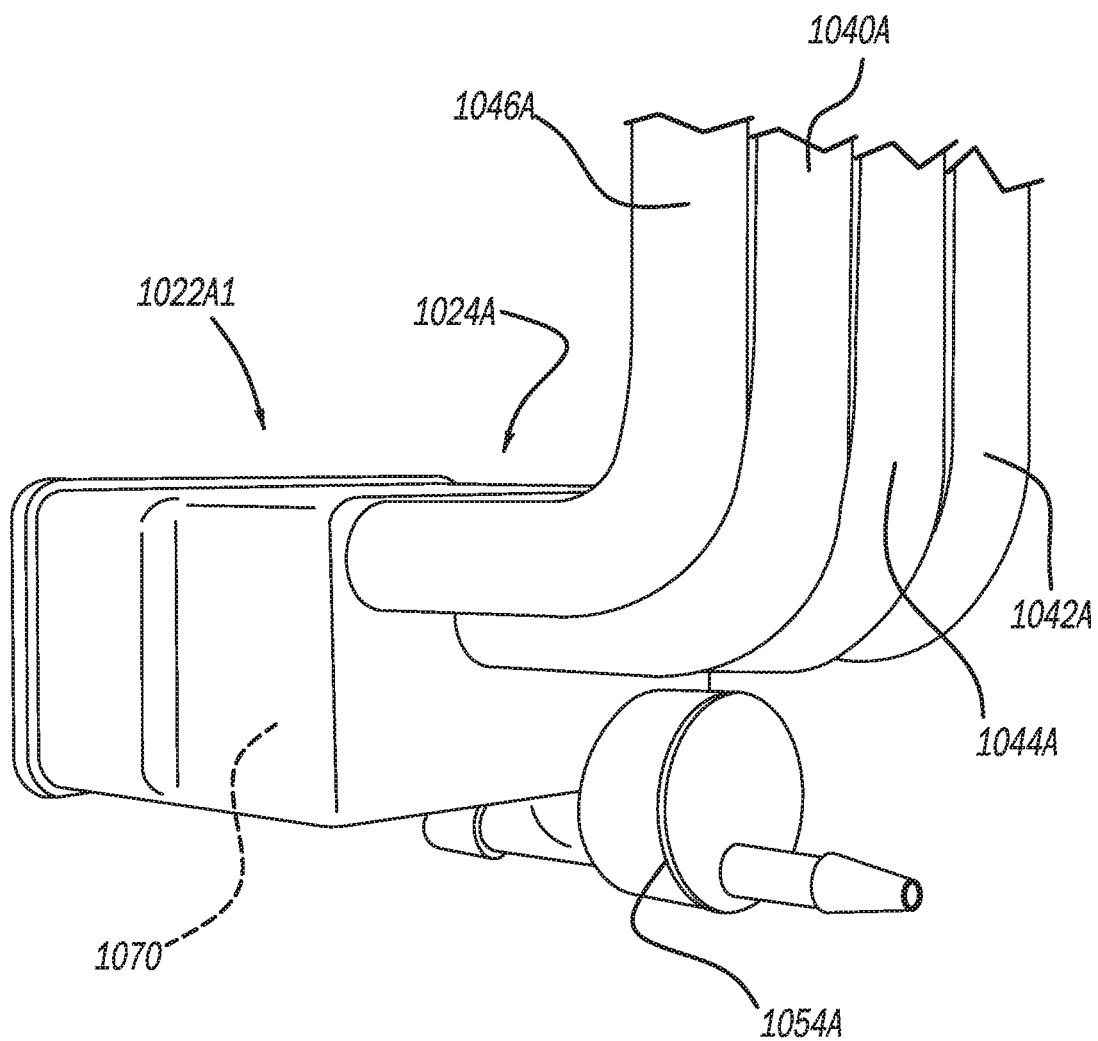
FIG. 5 is a perspective view of the vent shut-off assembly of the fuel tank system of FIG. 4.

Turning now to FIGS. 4 and 5, a fuel tank system 1010A constructed in accordance to another example of the present disclosure will be described. Unless otherwise described, the fuel tank system 1010A can include an evaporative emissions control system 1020A that incorporate features described above with respect to the fuel tank system 1010. The fuel tank system 1010A is incorporated on a saddle type fuel tank 1012A. A vent shut-off assembly 1022A1 can include a single actuator 1070 that communicates with a manifold 1024A to control opening and closing of three or more vent point inlets. In the example shown, the manifold assembly 1024A routs to a first vent 1040A, a second vent line 1042A and a third vent line 1044A. A vent 1046A routs to the canister (see canister 1032, FIG. 1). A liquid trap and a drain 1054A are incorporated on the manifold assembly 1024A. The fuel tank system 1010A can perform fuel tank isolation for high pressure hybrid applications without requiring a fuel tank isolation valve (FTIV). Further, the evaporative emissions control system 1020A can achieve the highest possible shut-off at the vent points. The system is not inhibited by conventional mechanical valve shut-off or reopening configurations. Vapor space and overall tank height may be reduced.

Figure 6:
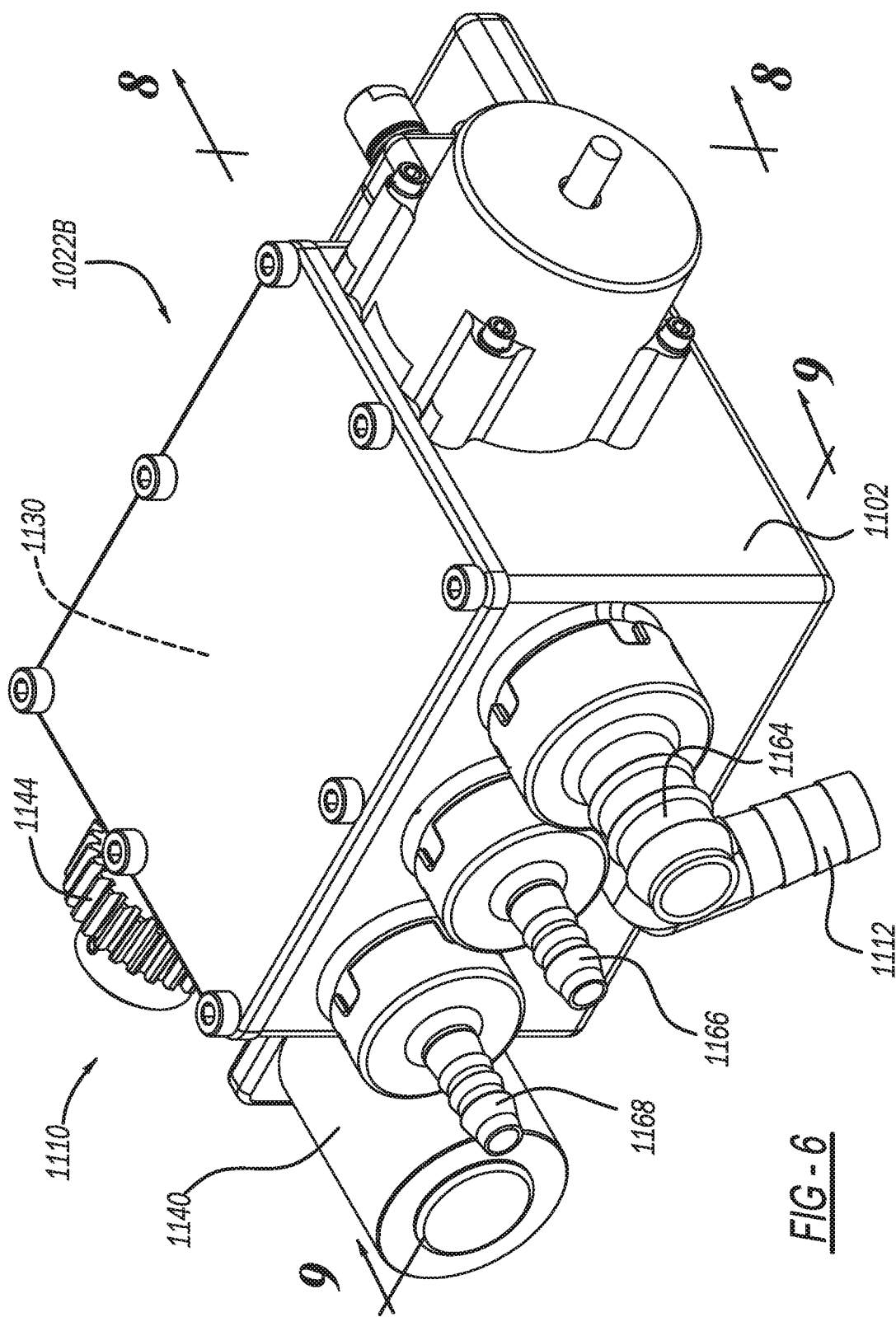
FIG. 6 is a top perspective view of a vent shut-off assembly constructed in accordance to additional features of the present disclosure.
Figure 7:
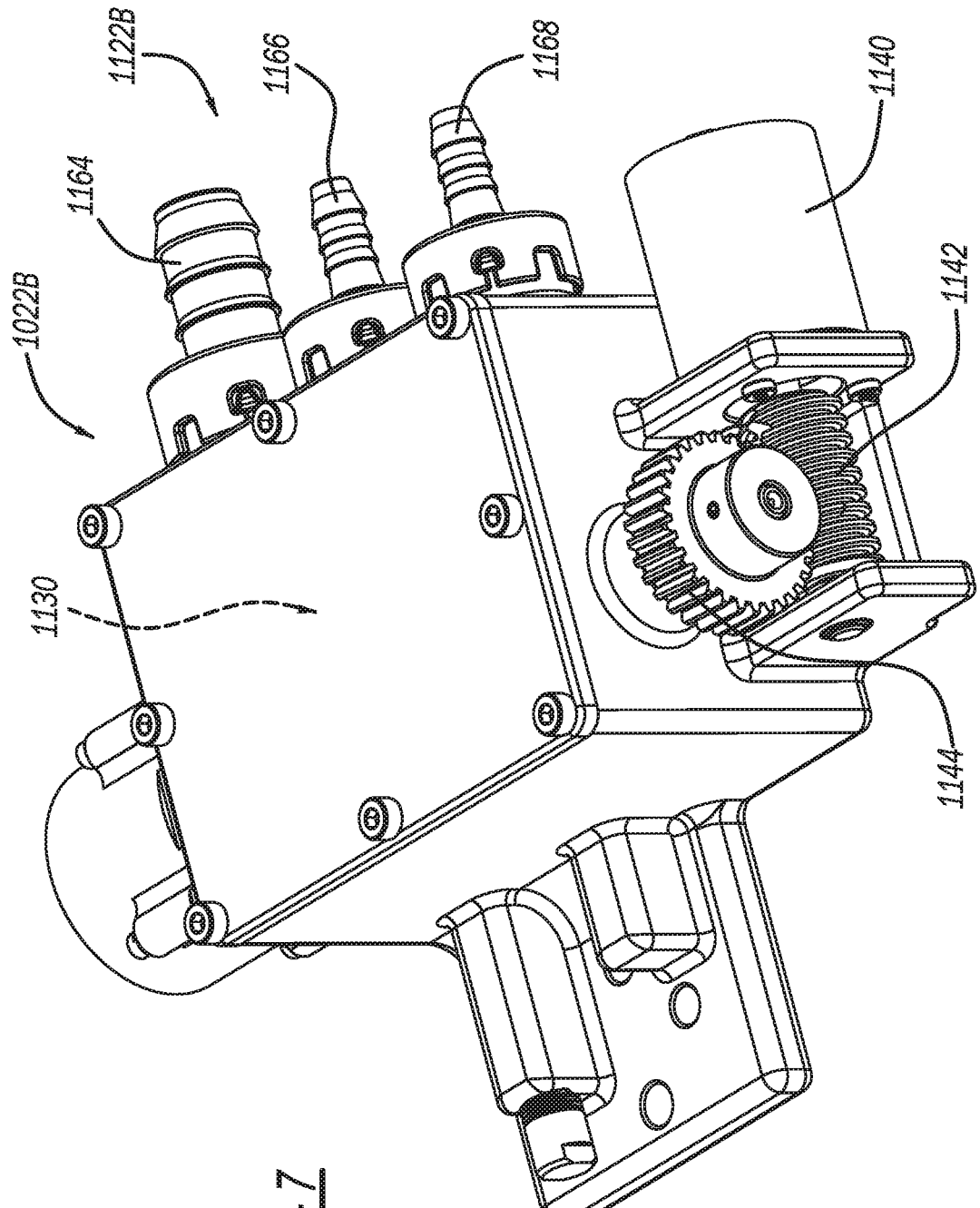
FIG. 7 is a bottom perspective view of the vent shut-off assembly of FIG. 6.
Figure 8:
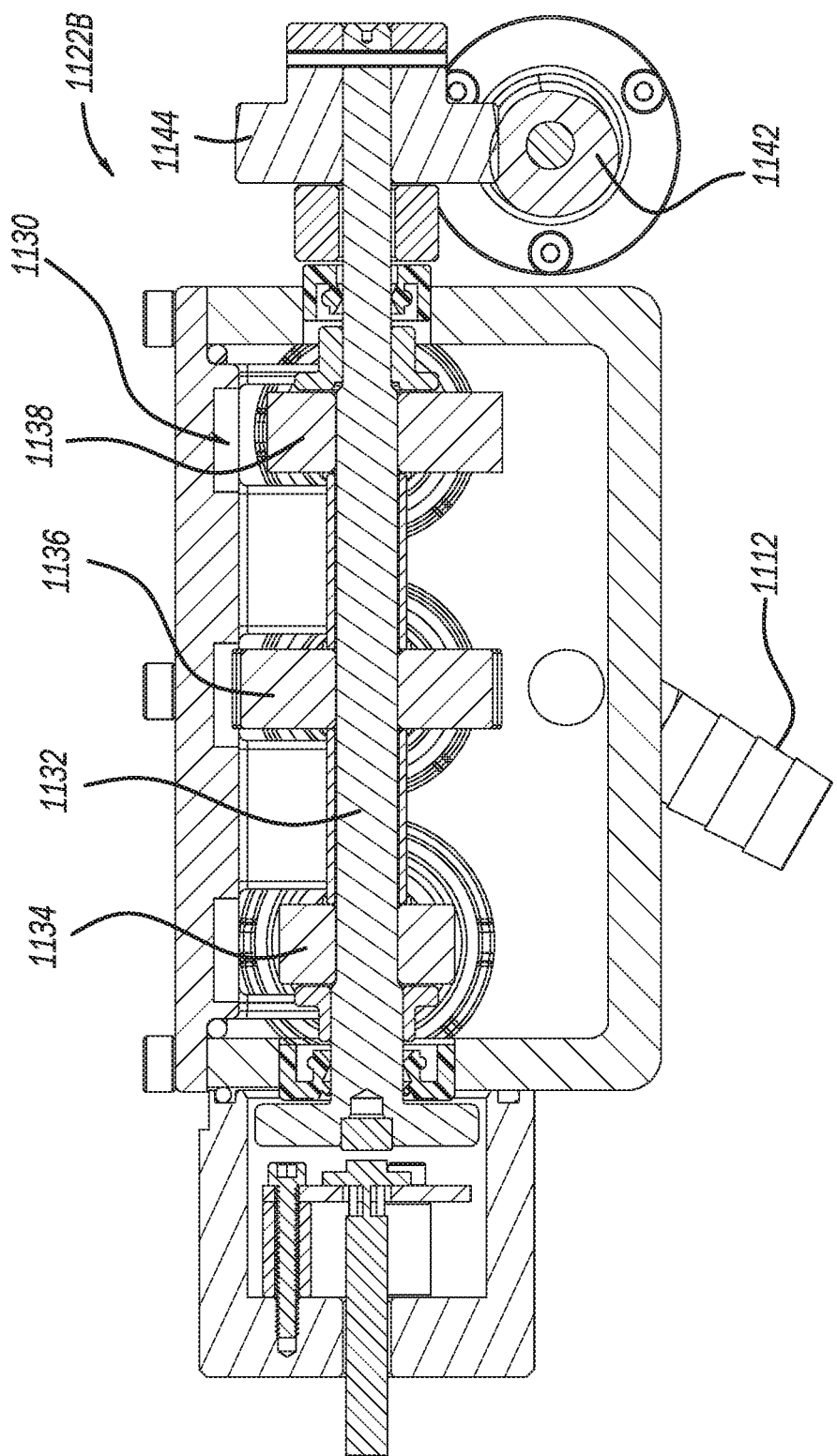
FIG. 8 is a sectional view of the vent shut-off assembly of FIG. 6 taken along lines 8-8.
Figure 9:
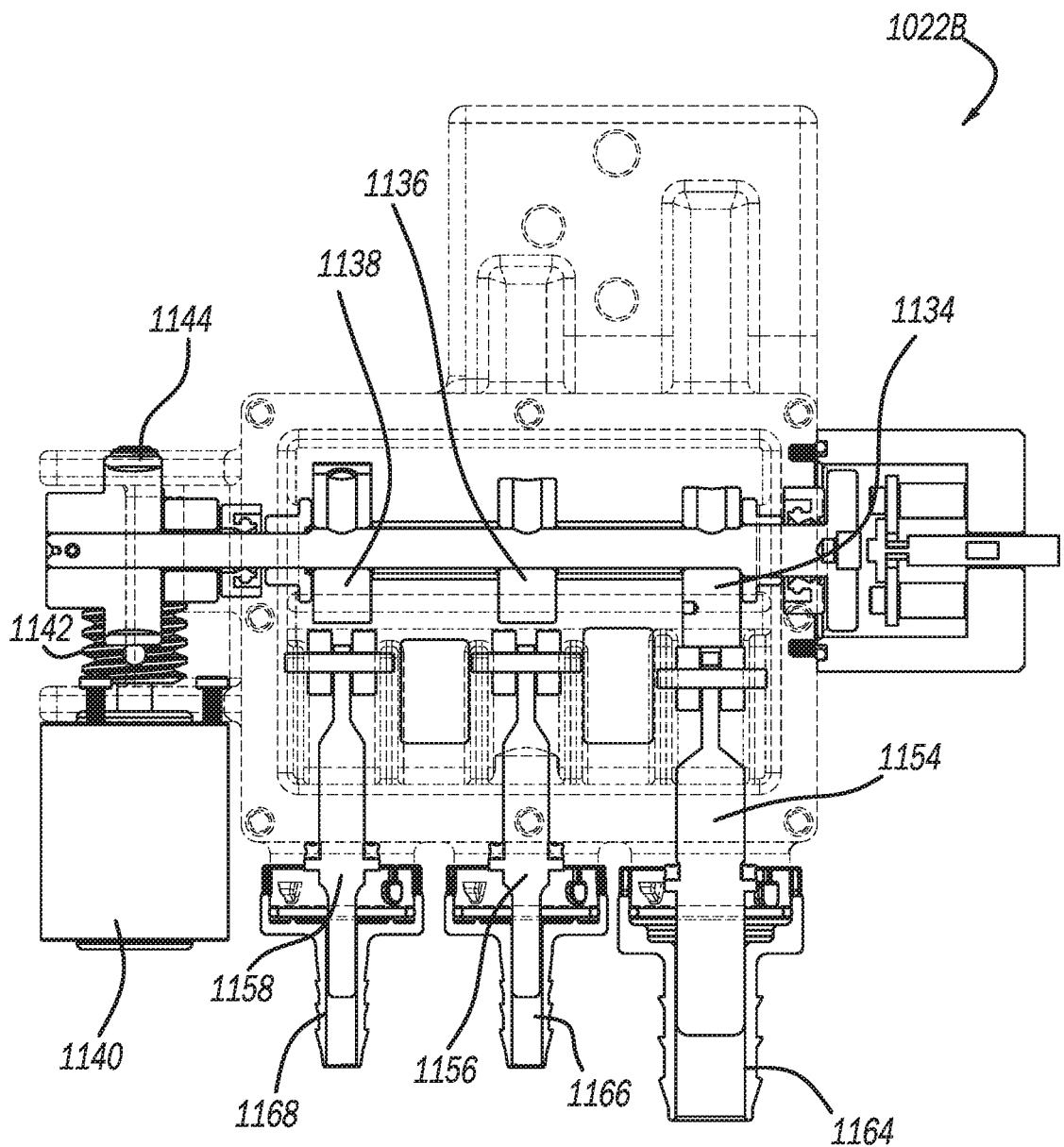
FIG. 9 is a sectional view of the vent shut-off assembly of FIG. 6 taken along lines 9-9.
Figure 10:
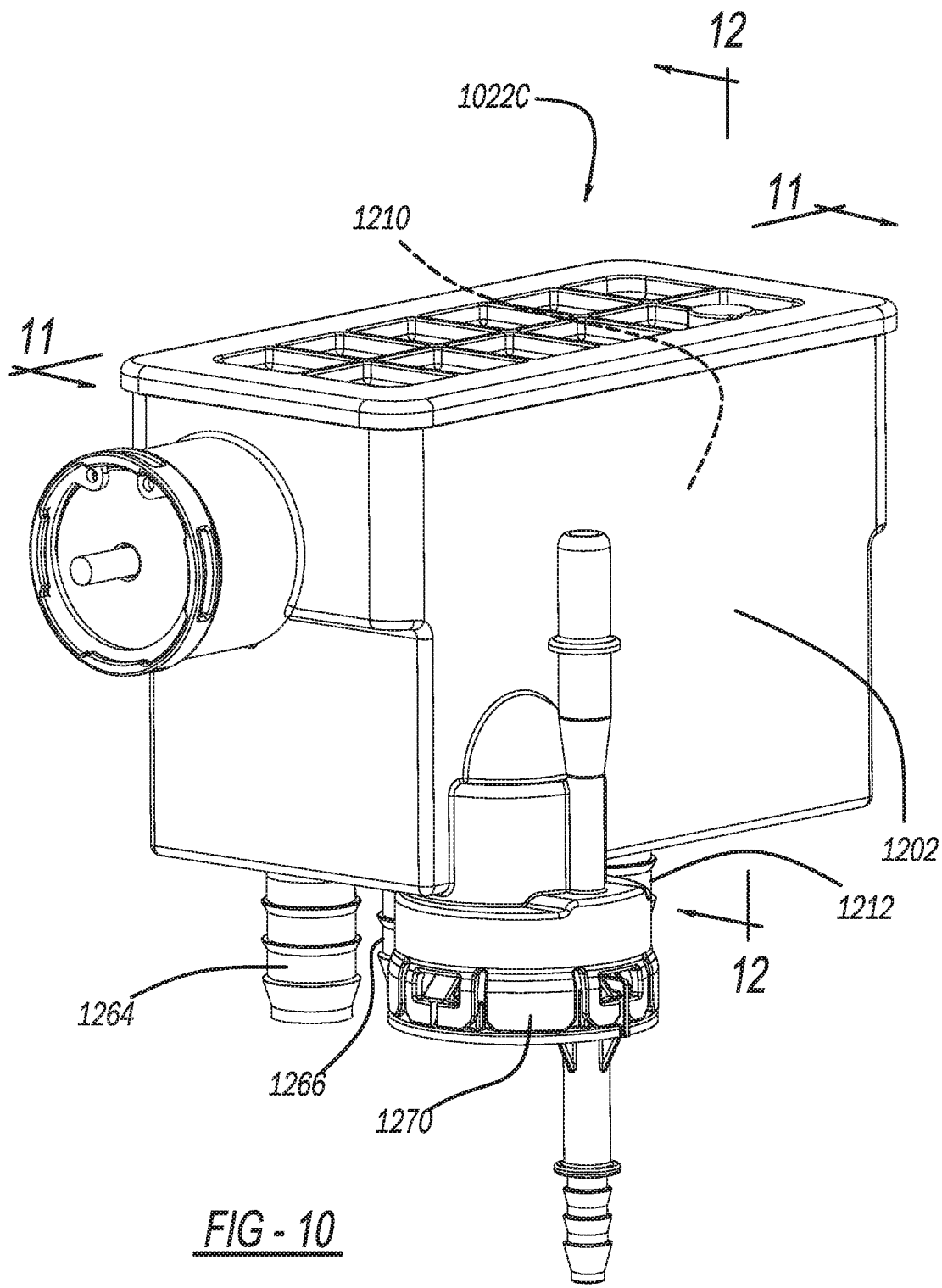
FIG. 10 is a front perspective view of a vent shut-off assembly constructed in accordance to another example of the present disclosure.
Figure 11:
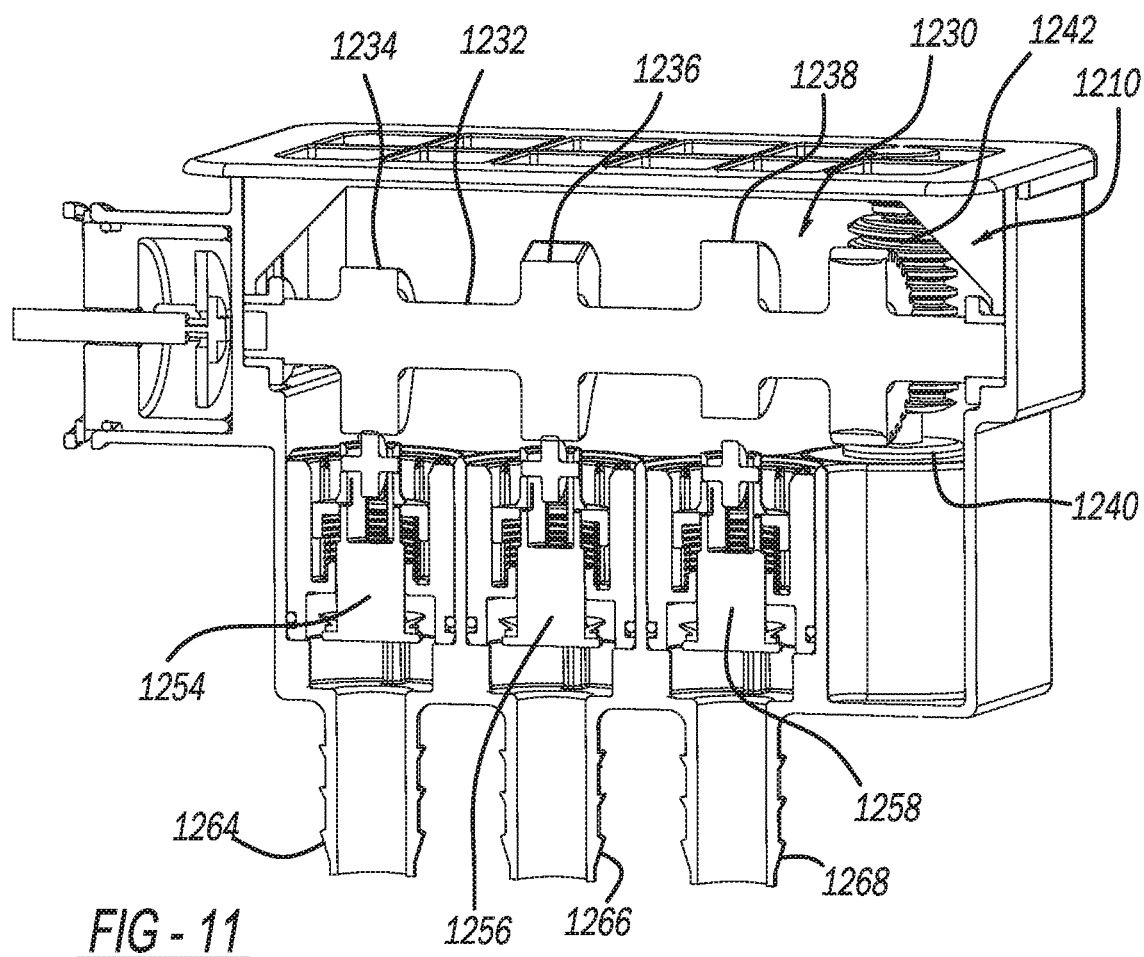
FIG. 11 is a sectional view of the vent shut-off assembly of FIG. 10 taken along lines 11-11.
Figure 12:
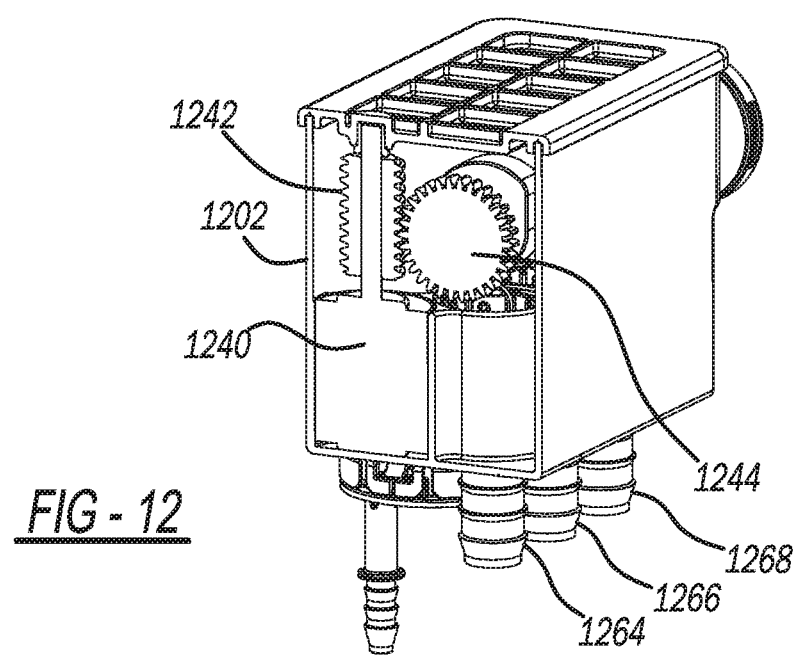
FIG. 12 is a sectional view of the vent shut-off assembly of FIG. 10 taken along lines 12-12.

Turning now to FIGS. 6-7, a vent shut-off assembly 1022B constructed in accordance to another example of the present disclosure will be described. The vent shut-off assembly 1022B includes a main housing 1102 that at least partially houses an actuator assembly 1110. A canister vent line 1112 routs to the canister (see canister 1032, FIG. 1). The actuator assembly 1110 can generally be used in place of the solenoids described above to open and close selected vent lines. The vent shut-off assembly 1022B includes a cam assembly 1130. The cam assembly 1130 includes a cam shaft 1132 that includes cams 1134, 1136 and 1138. The cam shaft 1132 is rotatably driven by a motor 1140. In the example shown the motor 1140 is a direct current motor that rotates a worm gear 1142 that in turn drives a drive gear 1144. The motor 1140 is mounted outboard of the main housing 1102. Other configurations are contemplated. The cams 1134, 1136 and 1138 rotate to open and close valves 1154, 1156 and 1158, respectively. The valves 1154, 1156 and 1158 open and close to selectively deliver vapor through ports 1164, 1166 and 1168, respectively. In one example the motor 1140 can alternately be a stepper motor. In other configurations, a dedicated DC motor may be used for each valve. Each DC motor may have a home function. The DC motors can include a stepper motor, a bi-directional motor, a uni-directional motor a brushed motor and a brushless motor. The home function can include a hard stop, electrical or software implementation, trip switches, hard stop (cam shaft), a potentiometer and a rheostat.

In one configuration the ports 1164 and 1166 can be routed to the front and back of the fuel tank 1012. The port 1164 can be configured solely as a refueling port. In operation, if the vehicle is parked on a grade where the port 1166 is routed to a low position in the fuel tank 1012, the cam 1134 is rotated to a position to close the port 1164. During refueling, the valve 1154 associated with port 1164 is opened by the cam 1134. Once the fuel level sensor 1048 reaches a predetermined level corresponding to a "Fill" position, the controller 1030 will close the valve 1154. In other configurations, the cam 1134, valve 1154 and port 1164 can be eliminated leaving two cams 1136 and 1138 that open and close valves 1156 and 1158. In such an example, the two ports 1168 and 1166 can be 7.5 mm orifices. If both ports 1168 and 1166 are open, refueling can occur. If less flow is required, a cam position can be attained where one of the valves 1156 and 1158 are not opened all the way.

Turning now to FIGS. 10-13, a vent shut-off assembly 1022C constructed in accordance to another example of the present disclosure will be described. The vent shut-off assembly 1022C includes a main housing 1202 that at least partially houses an actuator assembly 1210. A canister vent line 1212 routes to the canister (see canister 1032, FIG. 1). The actuator assembly 1210 can generally be used in place of the solenoids described above to open and close selected vent lines. The vent shut-off assembly 1022C includes a cam assembly 1230. The cam assembly 1230 includes a cam shaft 1232 that includes cams 1234, 1236 and 1238. The cam shaft 1232 is rotatably driven by a motor 1240. In the example shown the motor 1240 is received in the housing 1202. The motor 1240 is a direct current motor that rotates a worm gear 1242 that in turn drives a drive gear 1244. Other configurations are contemplated. The cams 1234, 1236 and 1238 rotate to open and close valves 1254, 1256 and 1258, respectively. The valves 1254, 1256 and 1258 open and close to selectively deliver vapor through ports 1264, 1266 and 1268, respectively. In one example the motor 1240 can alternately be a stepper motor. A drain 1270 can be provided on the housing 1202.

In one configuration the ports 1264 and 1266 can be routed to the front and back of the fuel tank 1012. The port 1264 can be configured solely as a refueling port. In operation, if the vehicle is parked on a grade where the port 1266 is routed to a low position in the fuel tank 1012, the cam 1236 is rotated to a position to close the port 1266. During refueling, the valve 1254 associated with port 1264 is opened by the cam 1234. Once the fuel level sensor 1048 reaches a predetermined level corresponding to a "Fill" position, the controller 1030 will close the valve 1254. In other configurations, the cam 1234, valve 1254 and port 1264 can be eliminated leaving two cams 1236 and 1238 that open and close valves 1256 and 1258. In such an example, the two ports 1268 and 1266 can be 7.5 mm orifices. If both ports 1268 and 1266 are open, refueling can occur. If less flow is required, a cam position can be attained where one of the valves 1256 and 1258 are not opened all the way.

Figure 14:
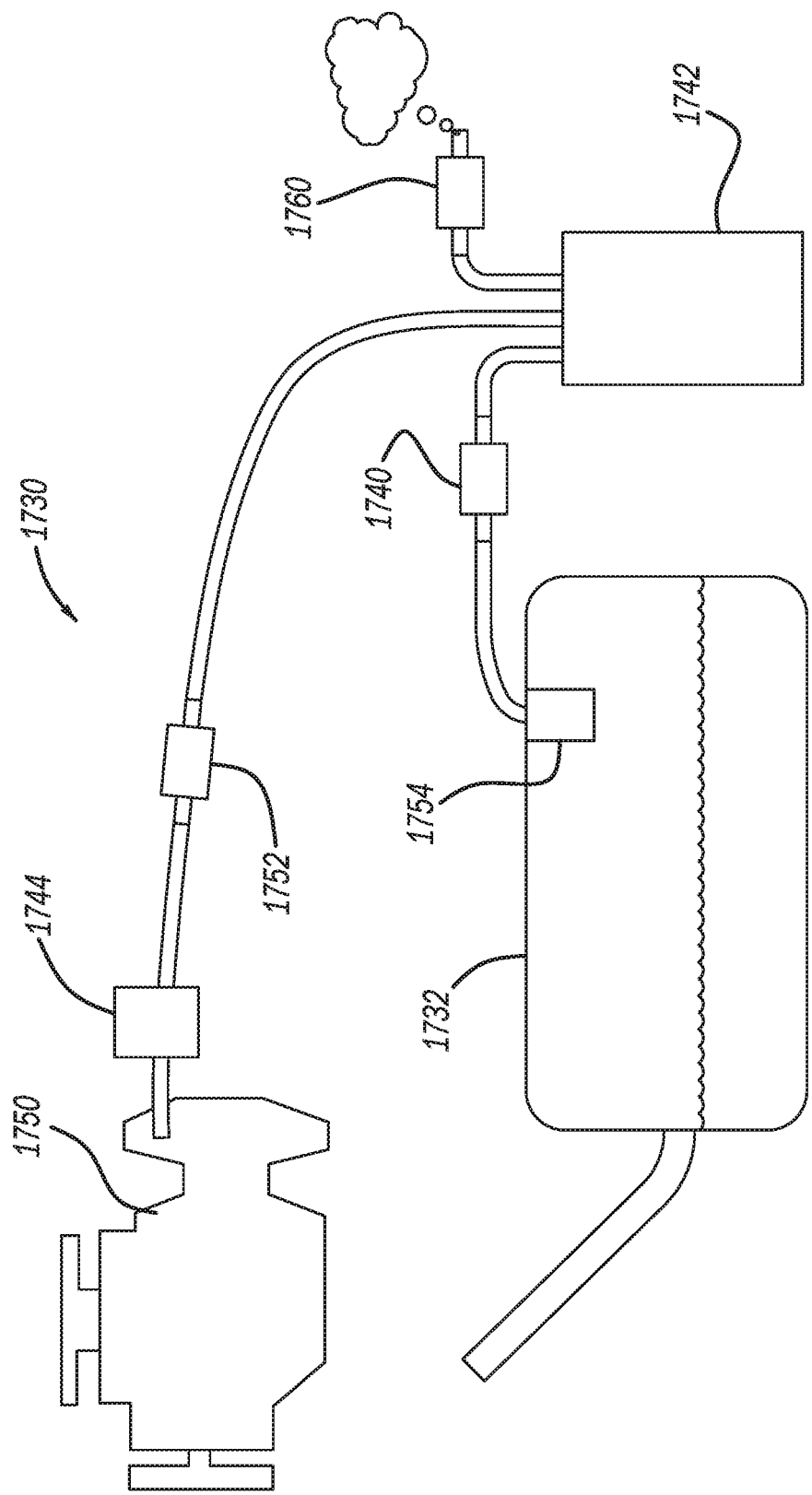
FIG. 14 is a schematic illustration of a schematic illustration of a fuel system incorporating valves according to prior art.

Turning now to FIG. 14, a fuel system according to a prior art example is shown and identified at reference numeral 1730. The fuel system 1730 includes a fuel tank 1732. A first valve 1740 can be fluidly connected between in-tank valves 1754 and a carbon canister 1742. A second valve 1752 can be fluidly connected between the carbon canister 1742 and a vapor management valve 1744. The vapor management valve 1744 can then fluidly connect with an engine 1750. A third valve 1760 fluidly connects the carbon canister 1742 to atmosphere.

Figure 15:
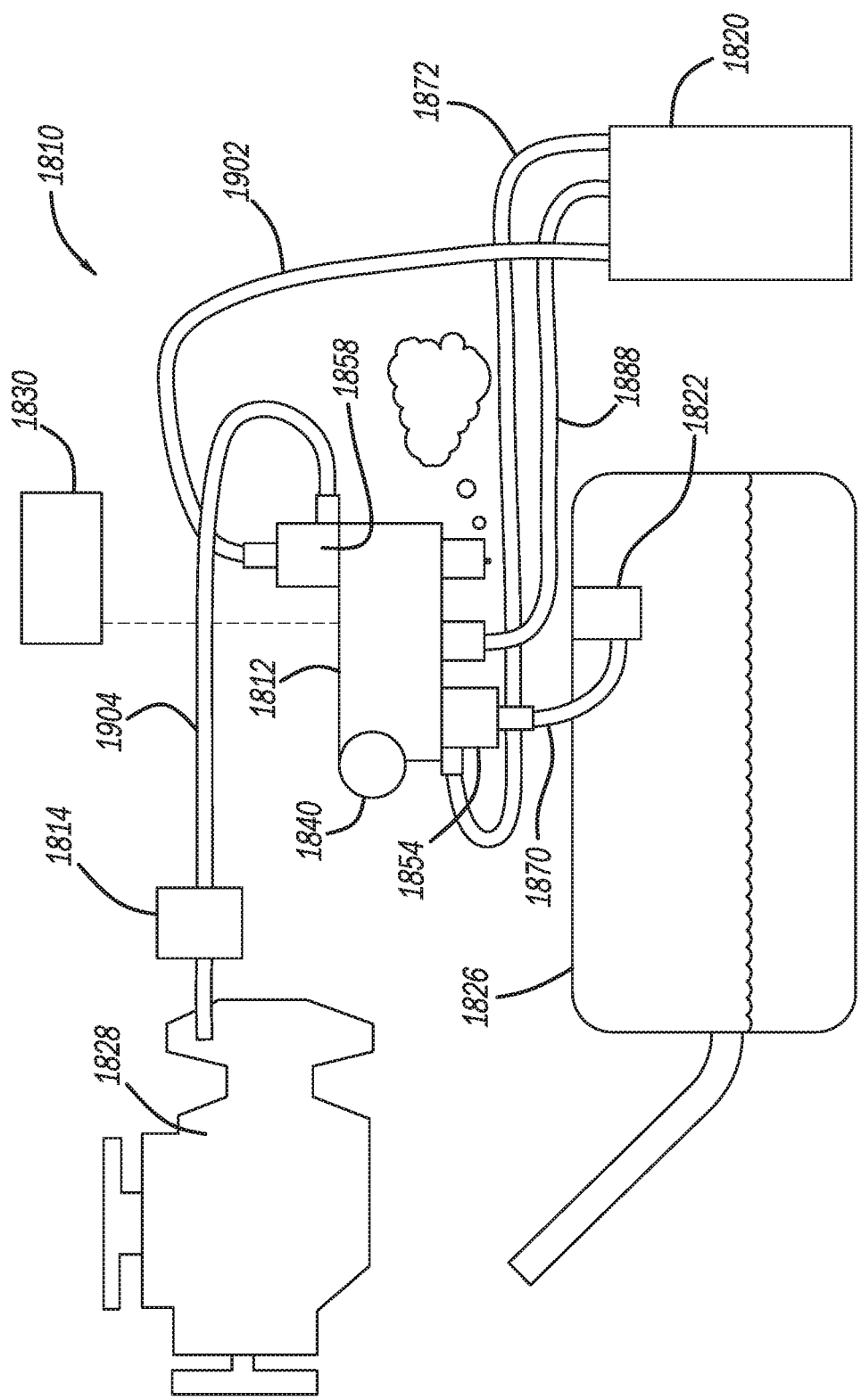
FIG. 15 is a schematic illustration of an evaporative emissions isolation module cam system according to one example of the present disclosure.
Figure 16:
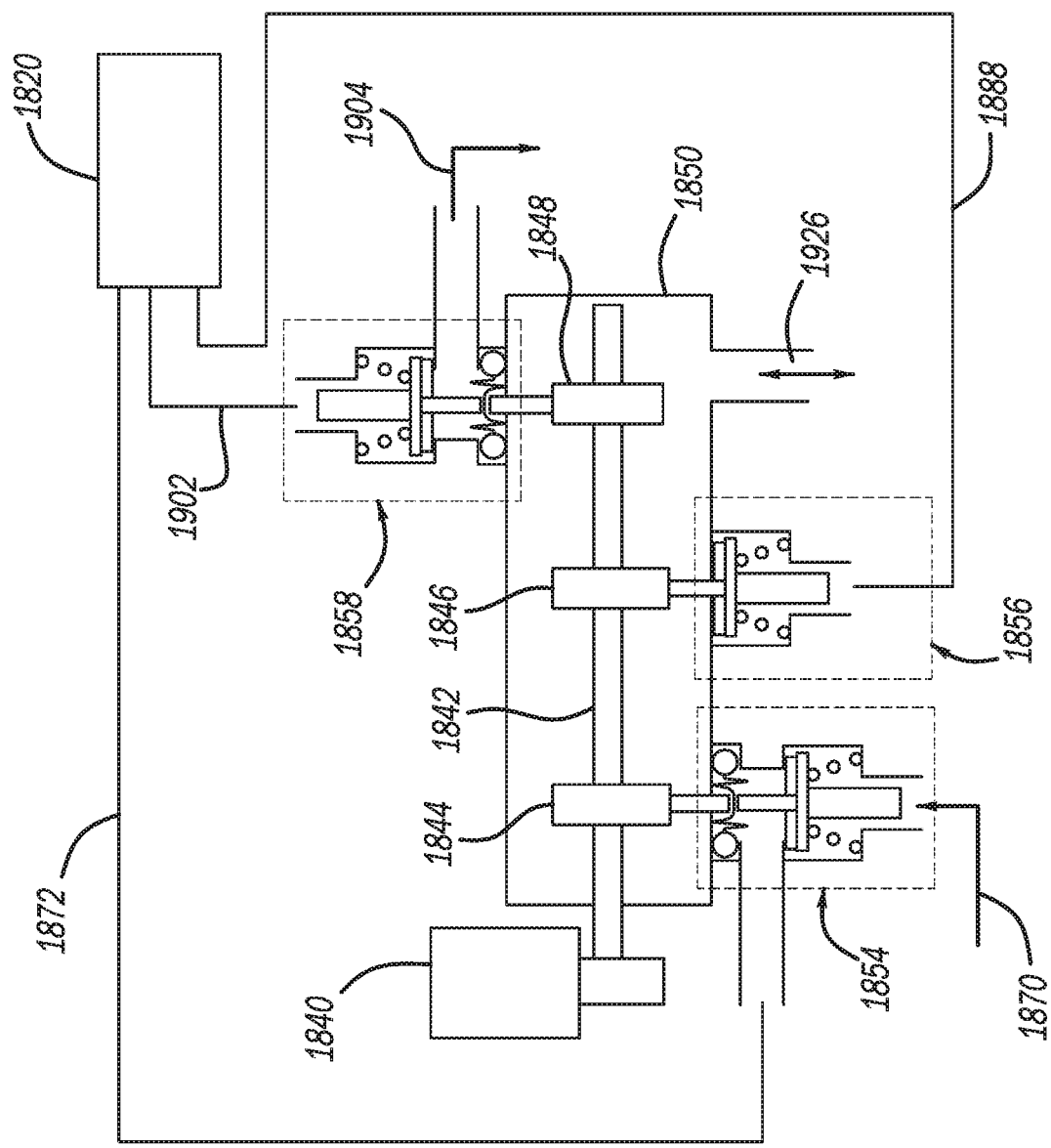
FIG. 16 is a schematic illustration of the eVap multi-valve of the system of FIG. 15.
Figure 17:
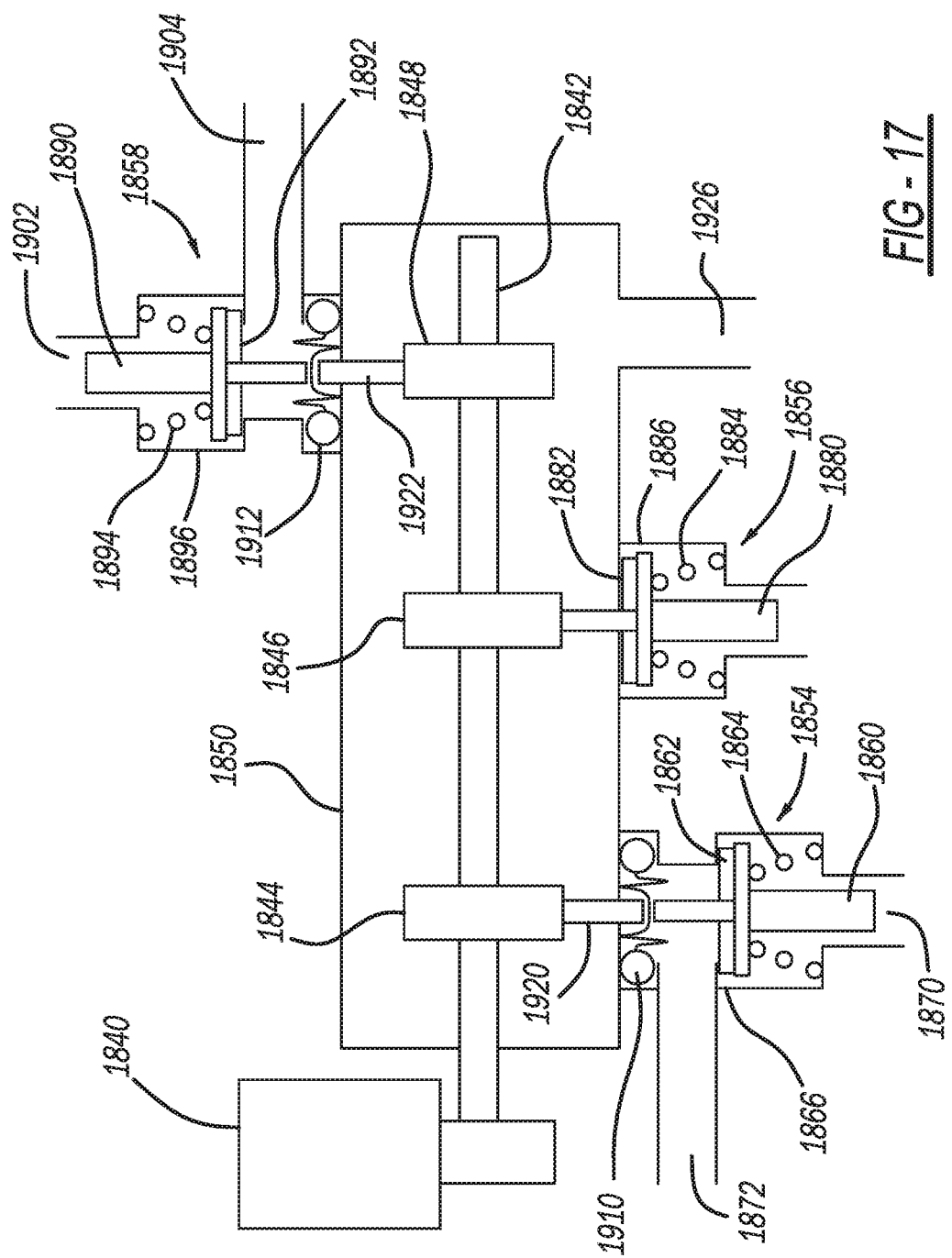
FIG. 17 is another schematic illustration of the eVap multi-valve of FIG. 16.

FIG. 15 illustrates an evaporative emissions isolation module cam system 1810 according to one example of the present disclosure. The evaporative emissions isolation module cam system 1810 can replace the system shown in FIG. 14 by utilizing a multi-valve assembly 1812 to control all evaporative emissions states without solenoids. The multi-valve assembly 1812 manages the venting of a carbon canister 1820. As will be described with further reference to FIG. 16, the multi-valve assembly 1812 selectively fluidly connects various components including a vapor management valve 1814, the carbon canister 1820, in-tank valves 1822 in the fuel tank 1826. The vapor management valve 1814 can then fluidly connect with an engine 1828.

The in-tank valves 1822 are represented as a box that leads to a vent line 1870 leading out of the fuel tank 1826. It will be appreciated that the in-tank valves 1822 can be one or any combination of valves within the fuel tank 1826 that lead to the vent line 1870. In this regard, the vent line 1870 represents the vent line that carries all downstream fuel vapors coming out of the fuel tank 1826 to the multi-valve assembly 1812. The evaporative emissions isolation module cam system 1810 can be used in conjunction with any of the evaporative emissions control systems described above, or can be used in a conventional fuel tank venting system.

A microprocessor or controller 1830 sends signals to the multi-valve assembly 1812 based on operating conditions to open and close various valves in the multi-valve assembly 1812 to control venting to and from the carbon canister 1820 as will become appreciated below. The multi-valve assembly 1812 can provide a single assembly that replaces the three separate solenoid valve configuration shown in FIG. 14.

The multi-valve assembly 1812 includes a motor drive 1840 that rotates a camshaft 1842 having cams 1844, 1846 and 1848. The camshaft 1842 and respective cams are housed in a manifold 1850. Each cam 1844, 1846 and 1848 has a cam profile configured to open and close respective valves 1854, 1856 and 1858. The first valve 1854 has a poppet 1860, seal 1862 and biasing member 1864. The biasing member 1864 urges the seal 1862 of the poppet 1860 to a closed position sealingly engaged to a first valve body 1866. The first valve 1854 selectively fluidly connects the fuel tank 1826 to the canister 1820. A first fluid line 1870 connects between the fuel tank 1826 and the first valve 1854. A second fluid line 1872 connects between the canister 1820 and the first valve 1854.

The second valve 1856 has a poppet 1880, a seal 1882 and a biasing member 1884. The biasing member 1884 urges the seal 1882 of the poppet 1880 to a closed position sealingly engaged to a second valve body 1886. A third fluid line 1888 connects between the canister 1820 and the second valve 1856. The third valve 1858 has a poppet 1890, a seal 1892 and a biasing member 1894. The biasing member 1894 urges the seal 1892 of the poppet 1890 to a closed position sealingly engaged to a third valve body 1896. A fourth fluid line 1902 connects between the canister 1820 and the third valve 1858. A fifth fluid line 1904 connects between the vapor management valve 1814 and the third valve 1858. A first isolation diaphragm 1910 is positioned between the third valve 1858 and the manifold 1850.

A second isolation diaphragm 1912 is positioned between the first valve 854 and the manifold 1850. The first and second isolation diaphragms 1910 and 1912 seal the manifold 1850 from the fluid lines 1904 and 1872, respectively. A first push pin 1920 is positioned between the cam 1844 and the poppet 1860. A second push pin 1922 is positioned between the cam 1848 and the poppet 1890. The manifold 1850 vents to atmosphere through vent port 1926. The isolation diaphragms 1910 and 1920 allow the poppets 1860 and 1890 to be actuated while precluding hydrocarbons from passing from the lines 1872 and 1904 through the manifold and out vent port 1926.

The microprocessor 1830 manages the fuel system by sending signals to the multi-valve assembly 1812 to operate the motor drive 1840, thereby turning the camshaft 1842 such that the respective valves 1854, 1856 and 1858 are in a desired open and closed position to control venting, refueling, pressure management and purge states.

Figure 18:
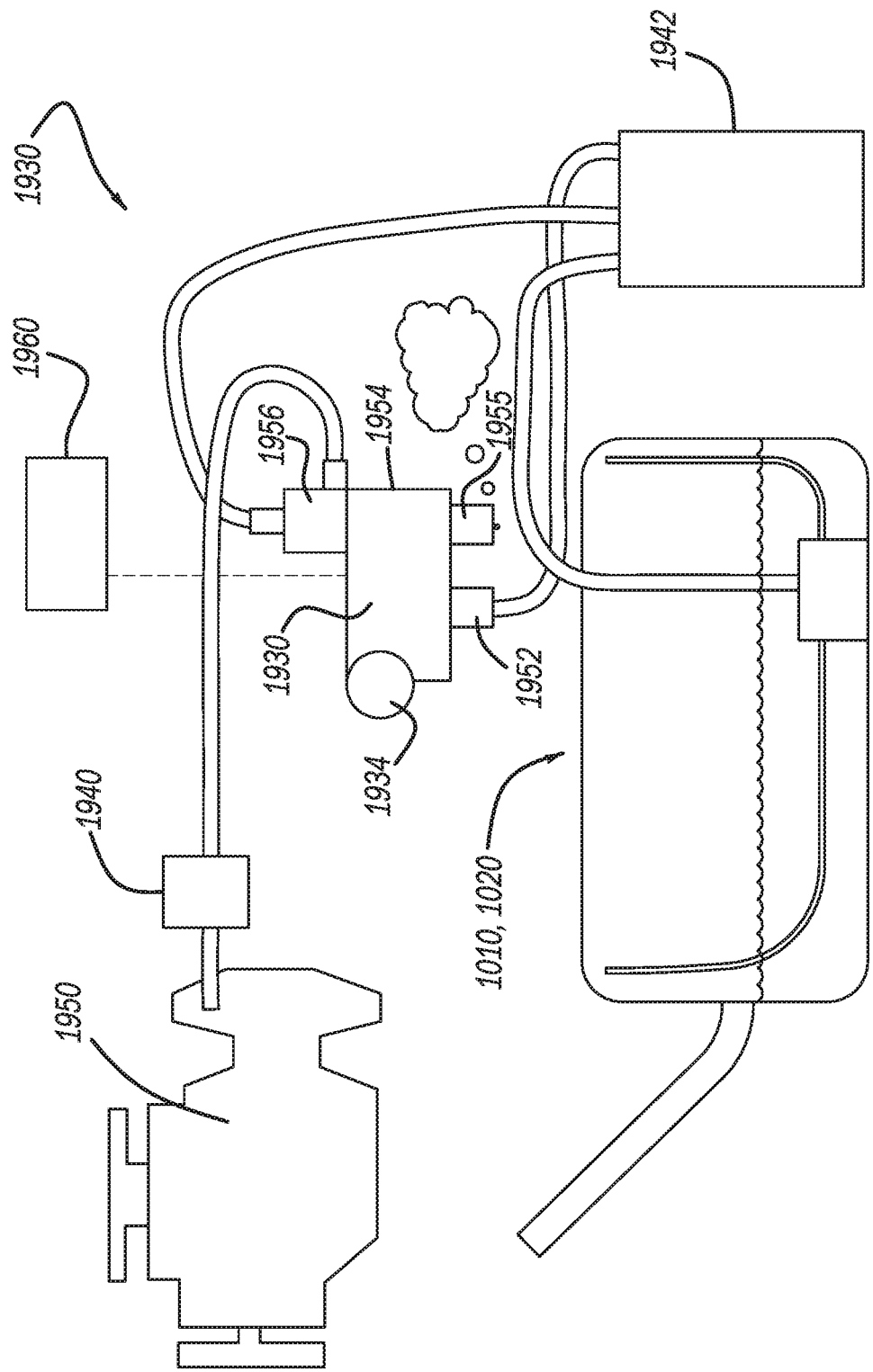
FIG. 18 is a schematic illustration of an evaporative emissions isolation module cam system according to another example of the present disclosure.

FIG. 18 illustrates a schematic illustration of an evaporative emissions isolation module cam system 1930 according to another example of the present disclosure. The isolation system 1930 can be used in combination with the above in-tank systems such as 1010 and 1020 described above. The in-tank system would cover the fuel tank to canister isolation function. The isolation system 1930 includes a multi-valve assembly 1932 that selectively fluidly connects a vapor management valve 1940 and a carbon canister 1942. The multi-valve assembly 1932 can be a two cam lobe module that controls venting to the canister 1942 and to the vapor management valve 1940 and engine 1950. A first valve 1952 selectively fluidly connects manifold 1954 and the carbon canister 1942. The manifold has a port 1955 that vents to atmosphere similar to the port 1926 described above. A second valve 1956 is constructed similar to the valve 1858 described above and connects the carbon canister 1942 with the engine 1950. A microprocessor 1960 manages the fuel system by sending signals to the multi-valve assembly 1932 to operate a motor drive 1934, thereby turning a camshaft. By way of example, the multi-valve assembly 1932 can be constructed similar to the vent shut-off assembly 1022B described above.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An evaporative emissions isolation module system configured to manage venting on a fuel tank system configured to deliver fuel to an internal combustion engine, the evaporative emissions isolation module system comprising:
    a carbon canister adapted to collect fuel vapor emitted by the fuel tank and to subsequently release the fuel vapor to the engine;
    a multi-valve assembly including a motor drive that rotates a camshaft having at least a first cam and a second cam housed in a manifold, the multi-valve assembly having:
        a first valve that selectively fluidly connects the fuel tank and the carbon canister; and
        a second valve that fluidly connects the carbon canister with a vent port defined in the manifold that vents to atmosphere; and
    a controller that sends signals to the multi-valve assembly based on operating conditions to open and close at least one of the first and second valves.

2. The evaporative emissions isolation module system of claim 1 wherein the multi-valve assembly further comprises:
    a third cam provided on the camshaft;
    a third valve that selectively fluidly connects the carbon canister and the engine.

3. The evaporative emissions isolation module system of claim 1, further comprising a third vent line fluidly connected between the second valve and the carbon canister.

4. The evaporative emissions isolation module system of claim 1, further comprising a vapor management valve disposed between the multi-valve assembly and the engine.

5. The evaporative emissions isolation module system of claim 2, further comprising a first vent line fluidly connected between the fuel tank and the first valve and a second vent line fluidly connected between the carbon canister and the first valve.

6. The evaporative emissions isolation module system of claim 5 wherein the first valve includes a valve body and further comprises a poppet, a seal and a biasing member wherein the biasing member urges the seal of the poppet to a closed position sealingly engaged to the first valve body.

7. The evaporative emissions isolation module system of claim 6 further comprising a first isolation diaphragm positioned between the first valve and the manifold, the first isolation diaphragm sealing the first and second fluid lines from the manifold.

8. The evaporative emissions isolation module system of claim 5 wherein the third valve includes a valve body and further comprises a poppet, a seal and a biasing member wherein the biasing member urges the seal of the poppet to a closed position sealingly engaged to the third valve body.

9. The evaporative emissions isolation module system of claim 8 further comprising a second isolation diaphragm positioned between the third valve and the manifold.

10. The evaporative emissions isolation module system of claim 9, further comprising a first push pin positioned between the first cam and the first valve.

11. The evaporative emissions isolation module system of claim 10, further comprising a second push pin positioned between the third cam and the third valve.

12. An evaporative emissions isolation module system configured to manage venting on a fuel tank system configured to deliver fuel to an internal combustion engine, the evaporative emissions isolation module system comprising:
    a carbon canister adapted to collect fuel vapor emitted by the fuel tank and to subsequently release the fuel vapor to the engine;
    a multi-valve assembly including a motor drive that rotates a camshaft having at least a first cam and a second cam housed in a manifold, the multi-valve assembly having:
        a first valve that selectively fluidly connects the manifold and the carbon canister; and
        a second valve that fluidly connects the carbon canister and the engine; and
    a controller that sends signals to the multi-valve assembly based on operating conditions to open and close at least one of the first and second valves.

13. The evaporative emissions isolation module system of claim 12, further comprising an evaporative emissions control system that recaptures and recycles emitted fuel vapor on a vehicle fuel tank, the evaporative emissions control system comprising:
    a first vent tube disposed in the fuel tank;
    a second vent tube disposed in the fuel tank;
    a first vent valve disposed on the first vent tube that is configured to selectively open and close a first port fluidly coupled to the first vent tube;
    a second vent valve disposed on the second vent tube that is configured to selectively open and close a second port fluidly coupled to the second vent tube; and
    a vent shut-off assembly that selectively opens and closes the first and second valves to provide overpressure and vacuum relief for the fuel tank.

14. The evaporative emissions isolation module system of claim 13 wherein the vent shut-off assembly comprises a cam assembly having a cam shaft that includes a first cam and a second cam.

15. The evaporative emissions isolation module system of claim 12 wherein the first and second cams have respective profiles that correspond to at least a fully opened valve position, a fully closed valve position and a partially open valve position and wherein the first and second vent valves are caused to selectively open and close based on rotation of the respective first and second cams to deliver fuel vapor through the respective first and second vent tubes.

* * * * *